United States Patent
Hsu et al.

(10) Patent No.: US 11,619,257 B2
(45) Date of Patent: Apr. 4, 2023

(54) UNIVERSAL JOINT ASSEMBLY

(71) Applicant: PEGATRON CORPORATION, Taipei (TW)

(72) Inventors: Wei-Chih Hsu, Taipei (TW); Pen-Uei Lu, Taipei (TW); Mao-Hsiang Huang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 237 days.

(21) Appl. No.: 17/206,604

(22) Filed: Mar. 19, 2021

(65) Prior Publication Data
US 2021/0324903 A1    Oct. 21, 2021

(30) Foreign Application Priority Data

Apr. 21, 2020    (TW) ................................ 109113394

(51) Int. Cl.
*F16C 11/10*    (2006.01)
*F16C 11/06*    (2006.01)
*F16M 13/02*    (2006.01)

(52) U.S. Cl.
CPC .......... *F16C 11/0623* (2013.01); *F16C 11/10* (2013.01); *F16M 13/022* (2013.01)

(58) Field of Classification Search
CPC ....... F16C 11/10; F16C 11/103; F16C 11/106; F16C 11/12; F16C 11/0623; F16C 11/0638; F16C 11/0642; F16M 11/04; F16M 11/14
See application file for complete search history.

(56) References Cited

U.S. PATENT DOCUMENTS

| 11,098,840 | B2 * | 8/2021 | Ye .......................... F16M 11/16 |
| 11,248,648 | B2 * | 2/2022 | Ye .......................... F16C 11/106 |
| 2014/0086518 | A1 | 3/2014 | Wright | |
| 2016/0174396 | A1 * | 6/2016 | Wang ................... F16M 13/022 248/231.51 |
| 2018/0297429 | A1 | 10/2018 | Elterman | |

FOREIGN PATENT DOCUMENTS

| CN | 209370745 U | 9/2019 |
| FR | 3036751 A1 | 12/2016 |

* cited by examiner

*Primary Examiner* — Daniel J Wiley
(74) *Attorney, Agent, or Firm* — Muncy, Geissler, Olds & Lowe, P.C.

(57) ABSTRACT

The application discloses a universal joint assembly. The universal joint assembly, includes a base, two clamping members, a ball shaft, and a locking member. The base has an accommodating groove, a first opening and a second opening disposed opposite to the first opening. The clamping member is disposed inside the accommodating groove. Each of the two clamping members includes a bearing portion, a fulcrum portion, and a clamping portion. An adjustable space exists between an outer side of the bearing portion and an inner wall of the accommodating groove. The locking member presses the ball shaft and the bearing portion. The clamping member take a position where the fulcrum portion contacts the inner wall as a fulcrum, so that the clamping portion moves toward the ball shaft and clamps the ball shaft.

11 Claims, 6 Drawing Sheets

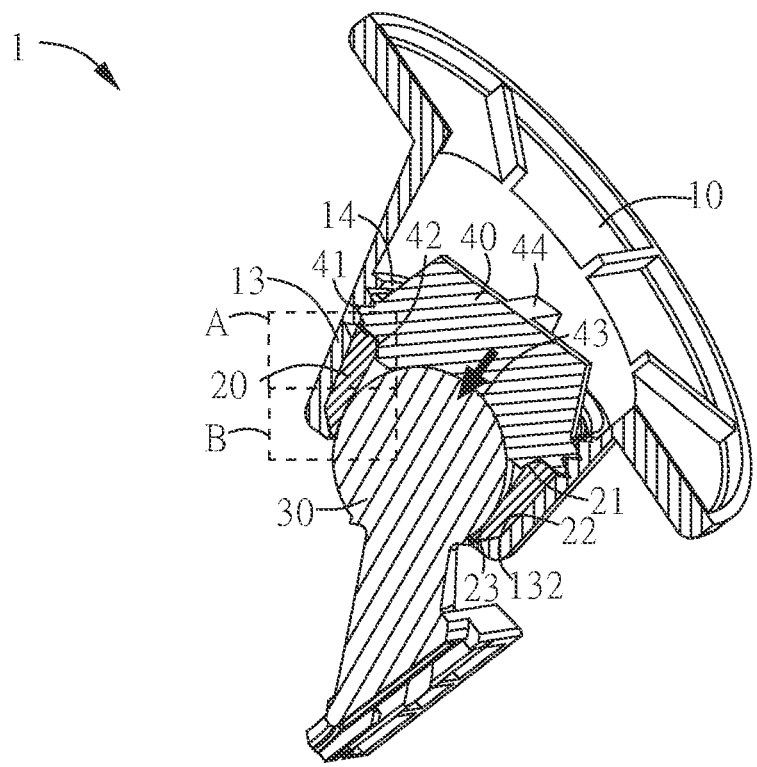
FIG. 6
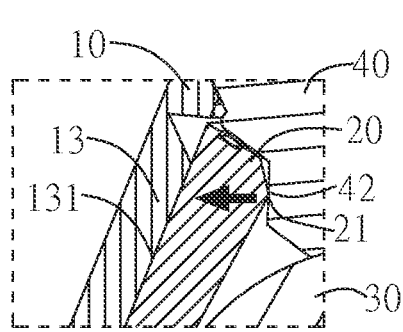 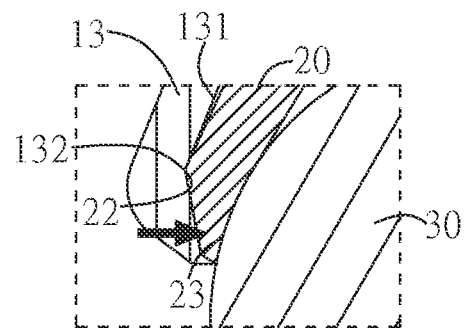
FIG. 7A FIG. 7B

UNIVERSAL JOINT ASSEMBLY

CROSS-REFERENCE TO RELATED APPLICATION

This application claims the priority benefit of Taiwan application no. 109113394, filed on Apr. 21, 2020. The entirety of the above-mentioned patent application is hereby incorporated by reference herein and made a part of this specification.

BACKGROUND

Technical Field

The application relates to a joint assembly, and in particular, to a universal joint assembly.

Related Art

Universal joints are applicable to various products, especially electronic products that require angle adjustment, for example, monitoring devices or display devices. FIG. 1 is a schematic diagram of a conventional universal joint assembly. Referring to FIG. 1, a universal joint assembly 9 usually includes a base 91, a ball shaft 92, and a locking member 93. The ball shaft 92 is disposed inside the base 91, and the locking member 93 is sleeved on an outer side of the base 91, to stabilize the connection relationship between the base 91 and the ball shaft 92. An electronic product may be installed on an end of the ball shaft 92 (or the base 91), so that the electronic product can be adjusted to different angles by means of the universal joint assembly 9.

As shown in FIG. 1, the locking member 93 is, for example, a C-shaped ring. In conventional technologies, the locking member 93 may also be of a sleeve type. However, whether of the C-shaped ring or sleeve type, the locking member 93 is disposed on the outer side of the base 91. Therefore, the locking member 93 can be removed from the outer side, resulting in that the electronic product may be taken away together with the ball shaft 92. In other words, the conventional universal joint assembly 9 only has a function of installing an electronic product, but cannot provide an anti-theft effect.

SUMMARY

In view of the foregoing problems, a main objective of the application is to provide a universal joint assembly, which is designed with a novel theft-proof structure to resolve the problem that conventional universal joint structures cannot provide an anti-theft effect.

To achieve the foregoing objective, the application provides a universal joint assembly. The universal joint assembly includes a base, two clamping members, a ball shaft, and a locking member. The base has an accommodating groove, a first opening and a second opening opposite to the first opening. The accommodating groove is connected to the first opening and the second opening. The clamping member is disposed inside the accommodating groove. Each of the two clamping members include a bearing portion, a fulcrum portion, and a clamping portion. The bearing portion is close to the first opening, and an adjustable space exists between an outer side of the bearing portion and an inner wall of the accommodating groove. The fulcrum portion is located between the bearing portion and the clamping portion, and the fulcrum portion is in contact with the inner wall. The clamping portion is close to the second opening and is in contact with the inner wall. The ball shaft is disposed between the two clamping members. The locking member enters the accommodating groove through the first opening and presses the ball shaft and the bearing portion. The two clamping members take a position where the fulcrum portion contacts the inner wall as a fulcrum, so that the clamping portion moves toward the ball shaft and clamps the ball shaft.

According to an embodiment of the application, the locking member has a pressing surface, and the pressing surface is an inclined surface tapering toward an interior of the locking member. The pressing surface is configured to press against the bearing portions of the two clamping members.

According to an embodiment of the application, when the locking member presses the ball shaft, the bearing portion is guided by the pressing surface to move toward the inner wall of the accommodating groove.

According to an embodiment of the application, the bearing portion is another inclined surface extending toward the ball shaft.

According to an embodiment of the application, the accommodating groove has a bending portion, and the fulcrum portion is located at the bending portion; and the accommodating groove forms a first angle at the bending portion, and the first angle is less than 180 degrees.

According to an embodiment of the application, each of the two clamping members form a second angle at the fulcrum portion, and the first angle is greater than the second angle.

According to an embodiment of the application, the base has an internal thread, the internal thread is located in the accommodating groove and is close to the first opening, and the locking member has an external thread engaging with the internal thread.

According to an embodiment of the application, a part of the bearing portion overlaps the internal thread.

According to an embodiment of the application, a side surface of each of the clamping members is in a shape of a tapered wedge.

According to an embodiment of the application, a length from the fulcrum portion to the bearing portion is greater than a length from the fulcrum portion to the clamping portion.

According to an embodiment of the application, an arc-shaped concave surface and an operating portion are respectively provided on two opposite sides of the locking member, and the arc-shaped concave surface is in contact with the ball shaft.

Based on the above, the universal joint assembly in the application includes the base, the two clamping members, the ball shaft, and the locking member. The clamping members are disposed inside the base, and the ball shaft is disposed between the two clamping members. The locking member is placed inside the accommodating groove, and presses the ball shaft and the bearing portion, so that the clamping members take a position where the fulcrum portion contacts the inner wall of the accommodating groove as the fulcrum, and the clamping portions move toward the ball shaft to clamp the ball shaft. Therefore, the upper edge of the ball shaft is fixed by the locking member, and the lower edge of the ball shaft is fixed by the clamping portion. Because the clamping members and the locking member are disposed inside the base, the ball shaft cannot be removed from the outside, thereby achieving an anti-theft effect.

BRIEF DESCRIPTION OF THE DRAWINGS

FIG. 6 is a schematic cross-sectional view showing that the locking member presses against a ball shaft;

FIG. 7A is a schematic enlarged view of a region A shown in FIG. 6; and

FIG. 7B is a schematic enlarged view of a region B shown in FIG. 6.

DETAILED DESCRIPTION

To make your examiner know the technical content of the application more clearly, preferred specific embodiments are listed for description.

Figure 1:
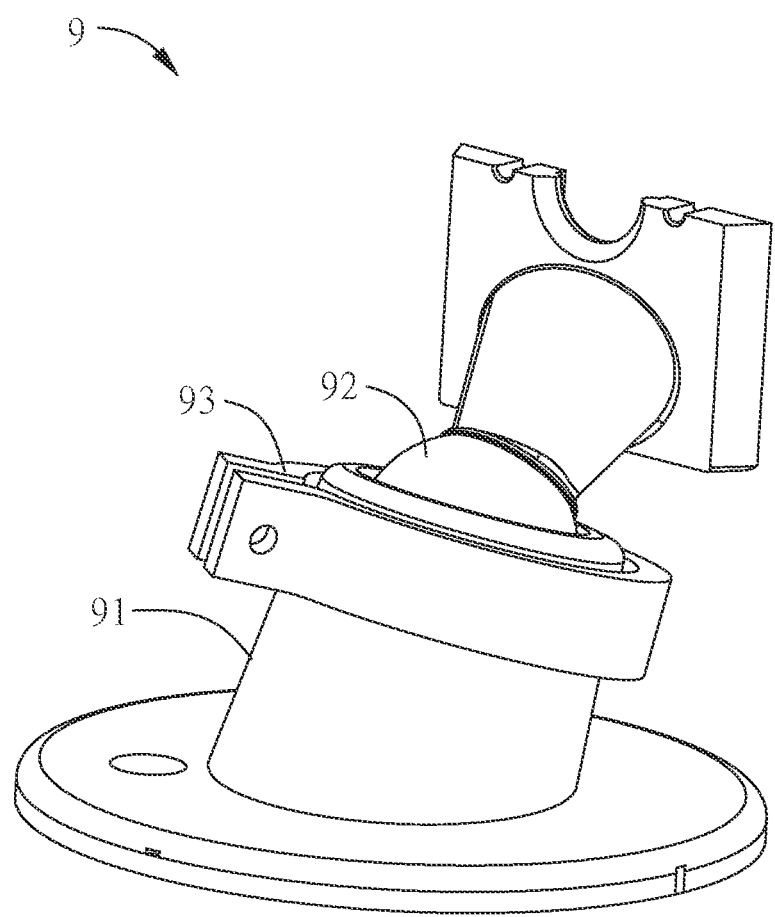
FIG. 1 is a schematic diagram of a conventional universal joint assembly.
Figure 2:
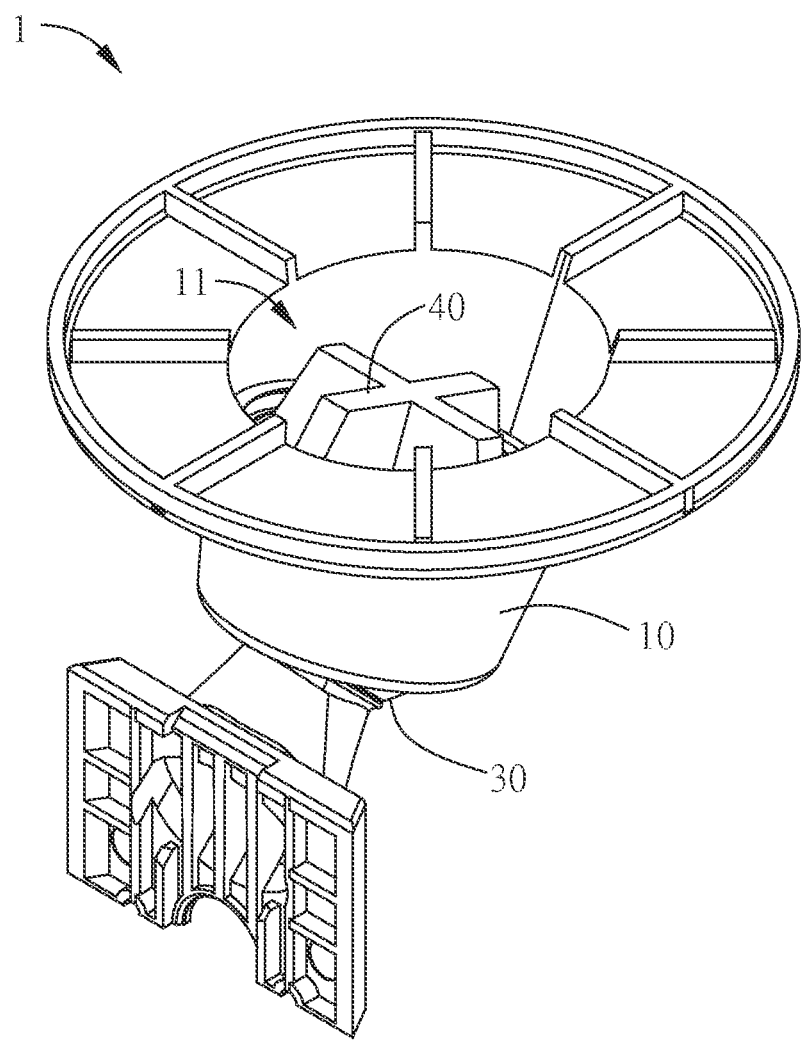
FIG. 2 is a schematic diagram of a universal joint assembly according to an embodiment of the application.
Figure 3:
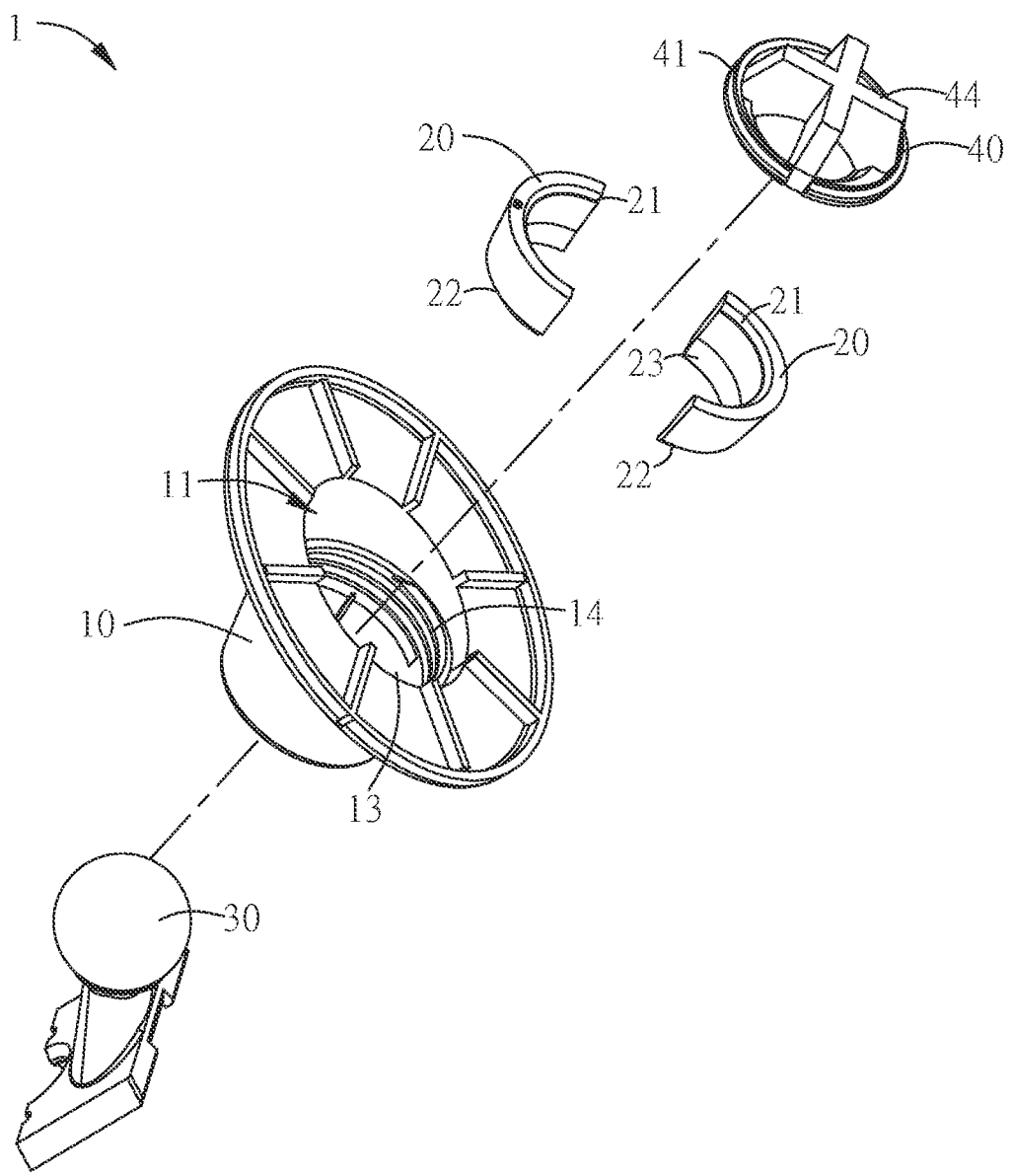
FIG. 3 is a schematic exploded view of the universal joint assembly shown in FIG. 2.
Figure 4:
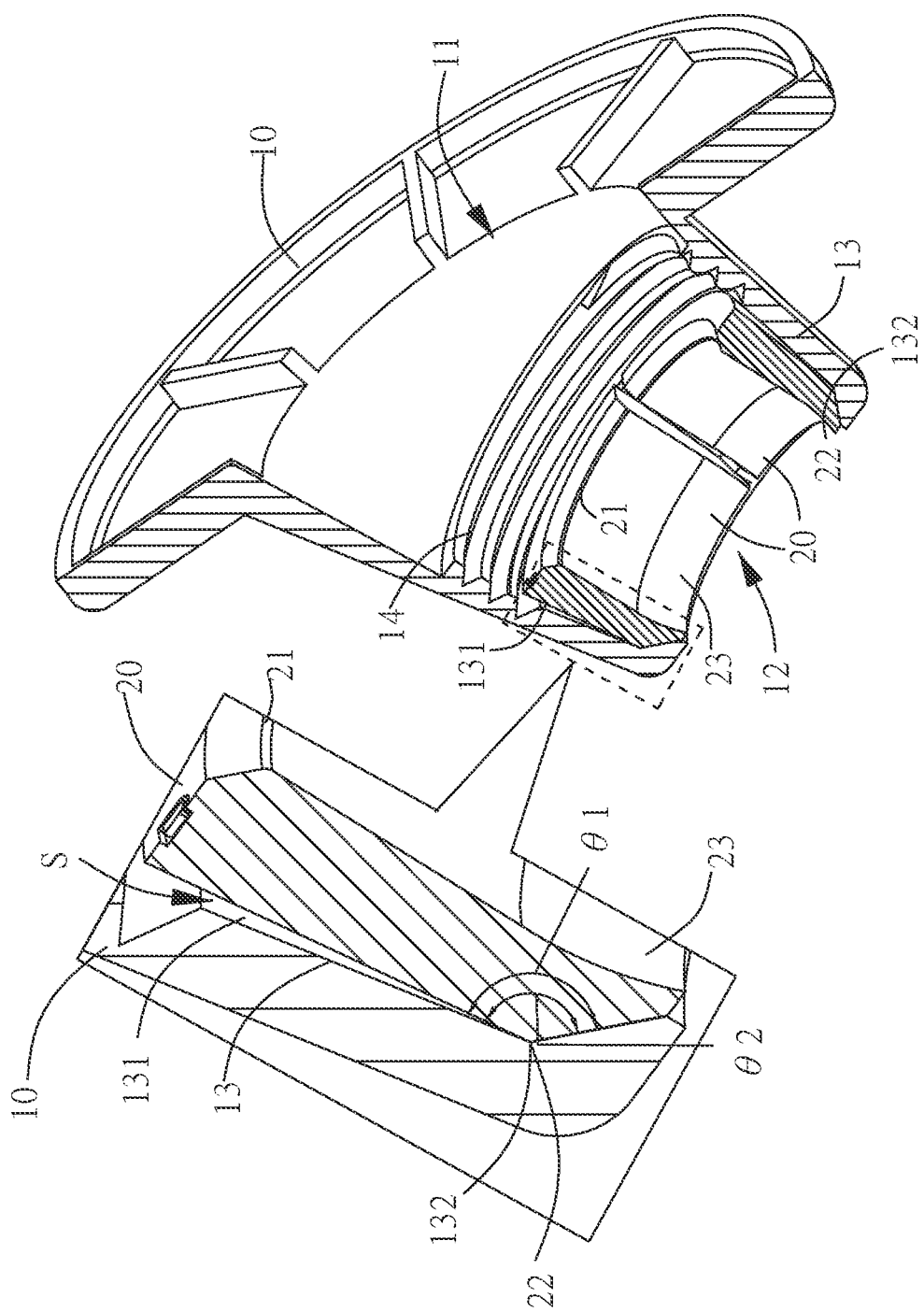
FIG. 4 is a schematic cross-sectional view showing that the clamping member shown in FIG. 3 is placed inside a base.

Referring to FIG. 2, FIG. 3, and FIG. 4, FIG. 2 is a schematic diagram of a universal joint assembly according to an embodiment of the application. FIG. 3 is a schematic exploded view of the universal joint assembly shown in FIG. 2. FIG. 4 is a schematic cross-sectional view showing that the clamping member shown in FIG. 3 is placed inside a base. In this embodiment, a universal joint assembly 1 includes a base 10, two clamping members 20, a ball shaft 30, and a locking member 40. The base 10 in this embodiment has a hollow cylindrical structure, and the base 10 has a first opening 11 and a second opening 12 opposite to the first opening. For example, from the perspective of FIG. 3, the first opening 11 is located above and the second opening 12 is located below. In this embodiment, an inner diameter of the first opening 11 is greater than an inner diameter of the second opening 12. In addition, the base 10 has an accommodating groove 13, and the accommodating groove 13 is connected to the first opening 11 and the second opening 12. Preferably, the base 10 further has an internal thread 14, and the internal thread 14 is located inside the accommodating groove 13 and is close to the first opening 11.

In terms of assembling of the universal joint assembly 1 in this embodiment, the clamping member 20 may be first placed inside the base 10 through the first opening 11 and disposed inside the accommodating groove 13. Specifically, an outer diameter of the clamping member 20 is greater than the inner diameter of the second opening 12, and therefore, after being placed inside the base 10, the clamping member 20 can be directly disposed inside the accommodating groove 13 without another mounting procedure. In addition, each of the two clamping members 20 include a bearing portion 21, a fulcrum portion 22, and a clamping portion 23. For example, as shown in FIG. 4, the bearing portion 21 is located at an upper edge of the clamping member 20, and the clamping portion 23 is located at a lower edge of the clamping member 20. In other words, the bearing portion 21 is close to the first opening 11, and the clamping portion 23 is close to the second opening 12. In addition, the fulcrum portion 22 is located between the bearing portion 21 and the clamping portion 23. Preferably, the fulcrum portion 22 in this embodiment is close to the clamping portion 23. In other words, a length from the fulcrum portion 22 to the bearing portion 21 is greater than a length from the fulcrum portion 22 to the clamping portion 23. When the clamping member 20 is disposed inside the accommodating groove 13, the fulcrum portion 22 is close to the second opening 12.

In addition, when the clamping member 20 is disposed inside the accommodating groove 13, the fulcrum portion 22 is in contact with an inner wall 131 of the accommodating groove 13. In this embodiment, the inner wall 131 of the accommodating groove 13 has a bending portion 132, so that the fulcrum portion 22 can be located at the bending portion 132 to be in contact with the inner wall 131. In addition, an adjustable space S exists between another portion of the clamping member 20 and the inner wall 131 of the accommodating groove 13. That is, other portions of the clamping member 20 are not in contact with the inner wall 131, and therefore, the clamping member 20 can swing in the accommodating groove 13 with the fulcrum portion 22 serving as a fulcrum. It should be noted that when the clamping member 20 is placed inside the accommodating groove 13 but does not clamp the ball shaft 30, an adjustable space S exists between an outer side of the bearing portion 21, the fulcrum portion 22, and the inner wall 131. Both the fulcrum portion 22 and the clamping portion 23 are in contact with the inner wall 131 of the accommodating groove 13.

Specifically, the accommodating groove 13 forms a first angle θ1 at the bending portion 132, and each of the clamping members 20 forms a second angle θ2 at the fulcrum portion 22. The first angle θ1 and the second angle θ2 are both less than 180 degrees. In other words, the accommodating groove 13 forms, at a location close to the second opening 12, an inclined surface tapering toward an interior (toward the ball shaft 30). Similarly, the fulcrum portion 22 of the clamping member 20 is also an inclined surface that tapers toward the interior (toward the ball shaft 30). In other words, a side surface of each of the clamping members 20 is in a shape of a tapered wedge, and a wedge-shaped portion is the clamping portion 23, thereby matching a structure of the accommodating groove 13. In addition, the first angle θ1 is greater than the second angle θ2, thereby forming a structure with adjustable space S between the clamping member 20 and the inner wall 131 of the accommodating groove 13.

During assembly, a user may hold the ball shaft 30 and place the ball shaft 30 inside the base 10 through the second opening 12 after the two clamping members 20 are first placed inside the base 10, and the ball shaft 30 is disposed between the two clamping members 20 under gravity. It should also be noted that a quantity of clamping members 20 is not limited in the application, provided that there are at least two clamping members 20. In other words, the universal joint assembly 1 may also include three clamping members 20, four clamping members 20, or another quantity of clamping members 20. One function of a plurality of clamping members 20 is that the clamping members 20 can be separated first to allow the ball shaft 30 to pass through the clamping members 20, and then the ball shaft 30 is located between the clamping members 20 under gravity. Another function is that the clamping members 20 can clamp a lower edge of the ball shaft 30 through rotation (or swinging). This is further described in the following paragraphs.

Figure 5:
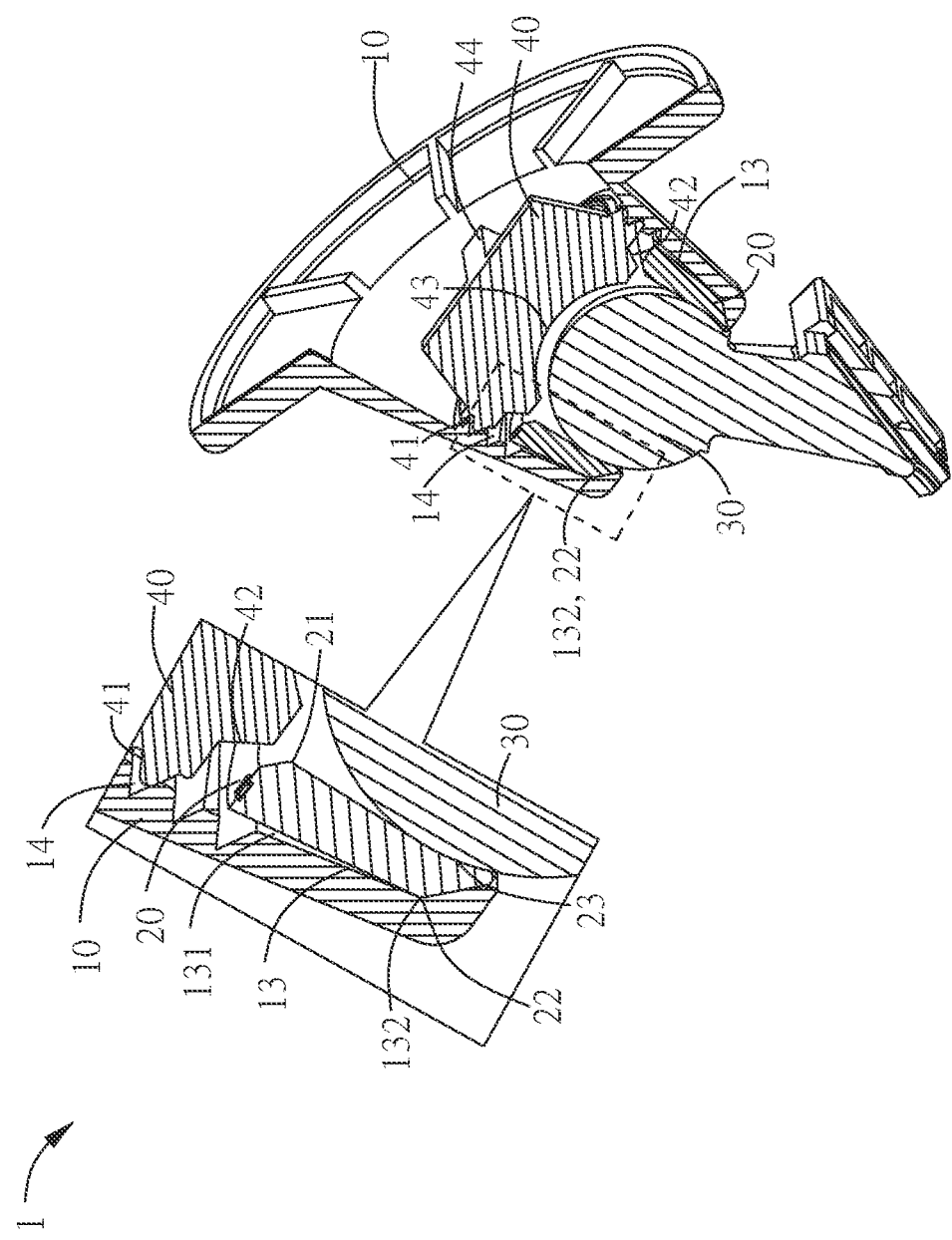
FIG. 5 is a schematic cross-sectional view showing that the locking member shown in FIG. 3 is placed inside the base.

FIG. 5 is a schematic cross-sectional view showing that the locking member shown in FIG. 3 is placed inside the base. FIG. 6 is a schematic cross-sectional view showing that the locking member shown in FIG. 5 presses against a ball shaft. Reference may be made to FIG. 5 and FIG. 6. Then, the locking member 40 is placed inside the base 10, the locking member 40 enters the accommodating groove 13 through the first opening 11, and the locking member 40 presses the ball shaft 30 and the bearing portion 21 downward. Specifically, the locking member 40 in this embodiment has an external thread 41, and the external thread 41 is engaging with an internal thread 14 of the base 10. Preferably, the external thread 41 is located at an outermost edge of the locking member 40. After the locking member 40 is placed inside the base 10, the locking member 40 may be screwed, toward the ball shaft 30 (that is, the locking member 40 is screwed downward), so that the locking member 40 is disposed in the base 10 and the locking member 40 presses the ball shall 30. In addition, a horizontal portion of the beating portion 21 overlaps the internal thread 14. Therefore, when being screwed downward, the locking member 40 presses the bearing portion 21.

FIG. 7A is a schematic enlarged view of a region A shown in FIG. 6. FIG. 7B is a schematic enlarged view of a region B shown in FIG. 6. Reference may be made to FIG. 6, FIG. 7A, and FIG. 7B. When a locking member 40 presses a ball shaft 30, an outer edge of the locking member 40 presses against bearing portions 21 of two clamping members 20. As shown in FIG. 7A, because an adjustable space S (as shown in FIG. 4) exists between the clamping member 20 and an inner wall 131 of the accommodating groove 13, the bearing portion 21 may move toward the inner wall 131. In addition, as shown in FIG. 7B, the two clamping members 20 take a position where the fulcrum portion 22 contacts the inner wall 131 as a fulcrum, and in this way, the clamping portion 23 located below moves toward the ball shaft 30 to clamp the ball shaft 30. Therefore, the upper edge of the ball shaft 30 is fixed by the locking member 40 and the lower edge of the ball shaft 30 is fixed by the clamping portion 23. In other words, in the universal joint assembly 1 in this embodiment, the ball shaft 30 is fixed by the damping member 20 and the locking member 40. Because the clamping member 20 and the locking member 40 are both disposed in the base 10, removal of the ball shaft 30 from the outside can be prevented, thereby achieving an anti-theft effect.

Preferably, the locking member 40 has a pressing surface 42, and the pressing surface 42 is an inclined surface tapering toward an interior of the locking member 40. In addition, the pressing surface 42 is located below the external thread 41 and tapers toward the ball shaft 30. The pressing surface 42 is configured to press against the bearing portion 21 of the clamping member 20, to guide the bearing portion 21 to move toward the inner wall 131 of the accommodating groove 13. Correspondingly, the bearing portion 21 of the clamping member 20 may preferably be another inclined surface extending toward the ball shaft 30. Based on the design in which the pressing surface 42 and the bearing portion 21 are inclined surfaces, an upper half of the clamping member 20 (a portion close to the bearing portion 21) may be smoothly guided to move toward the inner wall 131 of the accommodating groove 13.

In addition, an arc-shaped concave surface 43 and an operating portion 44 are respectively provided on two opposite sides of the locking member 40 in this embodiment. For example, from the perspective of FIG. 3 and FIG. 6, the arc-shaped concave surface 43 and the operating portion 44 are respectively located on a lower side and an upper side of the locking member 40. A user can hold the operating portion 44 to place the locking member 40 inside the base 10, and first screw the locking member 40 downward until the arc-shaped concave surface 43 is in contact with the ball shall 30 and the pressing surface 42 presses against the bearing portion 21 of the clamping member 20. Then, the user continues screwing the locking member 40 downward (applying a downward force). In this case, as shown in FIG. 7A, the locking member 40 presses the ball shaft 30 downward, and the bearing portion 21 is guided by the inwardly tapering pressing surface 42 to move outward. That is, the bearing portion 21 is guided by the pressing surface 42 to move toward the inner wall 131 of the accommodating slot 13. In addition, because the clamping member 20 take a position where the fulcrum portion 22 contacts the inner wall 131 as a fulcrum, the clamping portion 23 moves toward the ball shaft 30 to clamp the ball shaft 30.

Based on the above, the universal joint assembly in the application includes the base, the two clamping members, the ball shaft, and the locking member. The clamping members are disposed in the base, and the ball shaft is disposed between the two clamping members. The locking member is placed inside the accommodating groove, and presses the ball shaft and the bearing portion, so that the clamping member take a position where the fulcrum portion 22 contacts the inner wall of the accommodating groove as the fulcrum, to make the clamping portion move toward the ball shaft and clamp the ball shaft. Therefore, the upper edge of the ball shaft is fixed by the locking member, and the lower edge of the ball shaft is fixed by the clamping portion. Because the clamping member and the locking member are both disposed in the base, removal of the ball shaft from the outside can be prevented, thereby achieving an anti-theft effect. In addition, the more tightly the locking member locks, the more tightly the clamping portion clamps, and therefore, tightness of clamping the ball shaft by the clamping portion may also be adjusted through the locking member.

It should be noted that, the foregoing various embodiments are listed for ease of description, the scope claimed by the application shall be subject to the scope of the patent application rather than being limited to the foregoing embodiments.

What is claimed is:
1. A universal joint assembly, comprising:
a base, having an accommodating groove, a first opening and a second opening opposite to the first opening, wherein the accommodating groove is connected to the first opening and the second opening;
two clamping members, disposed inside the accommodating groove, wherein each of the two clamping members comprises a bearing portion, a fulcrum portion, and a clamping portion, the bearing portion is close to the first opening, an adjustable space exists between an outer side of the bearing portion and an inner wall of the accommodating groove, the fulcrum portion is located between the bearing portion and the clamping portion, the fulcrum portion is in contact with the inner wall, and the clamping portion is close to the second opening and is in contact with the inner wall;
a ball shaft, disposed between the two clamping members; and
a locking member, entering the accommodating groove through the first opening and pressing the ball shaft and the bearing portion, wherein the beating portion moves toward the inner wall in the adjustable space, so that the two clamping members take a position where the fulcrum portion contacts the inner wall as a fulcrum and the clamping portion moves toward the ball shaft to clamp the ball shaft.

2. The universal joint assembly according to claim 1, wherein the locking member has a pressing surface, the pressing surface is an inclined surface tapering toward an interior of the locking member, and the pressing surface is configured to press against the bearing portions of the two clamping members.

3. The universal joint assembly according to claim 2, wherein when the locking member presses the ball shaft, the bearing portion is guided by the pressing surface to move toward the inner wall of the accommodating groove.

4. The universal joint assembly according to claim 2, wherein the bearing portion is another inclined surface extending toward the ball shaft.

5. The universal joint assembly according to claim 1, wherein the accommodating groove has a bending portion, the fulcrum portion is located at the bending portion, the accommodating groove forms a first angle at the bending portion, and the first angle is less than 180 degrees.

6. The universal joint assembly according to claim 5, wherein each of the two clamping members form a, second angle at the fulcrum portion, and the first angle is greater than the second angle.

7. The universal joint assembly according to claim 1, wherein the base has an internal thread, the internal thread is located inside the accommodating groove and is close to the first opening, and the locking member has an external thread engaging with the internal thread.

8. The universal joint assembly according to claim 7, wherein a part of the bearing portion overlaps the internal thread.

9. The universal joint assembly according to claim 1, wherein a side surface of each of the clamping members is in a shape of a tapered wedge.

10. The universal joint assembly according to claim 1, wherein a length from the fulcrum portion to the bearing portion is greater than a length from the fulcrum portion to the clamping portion.

11. The universal joint assembly according to claim 1, wherein an arc-shaped concave surface and an operating portion are respectively provided on two opposite sides of the locking member, and the arc-shaped concave surface is in contact with the ball shaft.

* * * * *